United States Patent
Chen et al.

(10) Patent No.: US 11,183,096 B1
(45) Date of Patent: Nov. 23, 2021

(54) DRIVING SYSTEM AND METHOD OF TOUCH DISPLAY PANEL

(71) Applicant: FocalTech Systems Co., Ltd., Hsinchu (TW)

(72) Inventors: Yi-Chiung Chen, Hsinchu (TW); Jui-Lung Hung, Hsinchu (TW); Chien-Hao Cheng, Hsinchu (TW); Po-Sheng Shih, Hsinchu (TW)

(73) Assignee: FocalTech Systems Co., Ltd., Hsinchu (TW)

( * ) Notice: Subject to any disclaimer, the term of this patent is extended or adjusted under 35 U.S.C. 154(b) by 0 days.

(21) Appl. No.: 17/003,252

(22) Filed: Aug. 26, 2020

(30) Foreign Application Priority Data

Jul. 6, 2020 (TW) .................................. 109122758

(51) Int. Cl.
*G09G 3/20* (2006.01)
*G06F 3/041* (2006.01)

(52) U.S. Cl.
CPC ............. *G09G 3/20* (2013.01); *G06F 3/0412* (2013.01); *G09G 2310/0283* (2013.01); *G09G 2320/0233* (2013.01)

(58) Field of Classification Search
CPC ............. G09G 3/20; G09G 2310/0283; G09G 2320/0233; G06F 3/0412
See application file for complete search history.

(56) References Cited

U.S. PATENT DOCUMENTS

2017/0124975 A1* 5/2017 Xiao .................... G06F 3/04164
2020/0026137 A1* 1/2020 Kaneyoshi ........... G09G 3/3648

* cited by examiner

*Primary Examiner* — Peter D McLoone
(74) *Attorney, Agent, or Firm* — Muncy, Geissler, Olds & Lowe, P.C.

(57) ABSTRACT

A driving system of touch display panel includes a panel having an active area, a left gate driving circuit and a right gate driving circuit. The left gate driving circuit is disposed on the left side of the active area, and is connected with a plurality of left gate lines to provide gate driving voltages for performing driving in a scanning direction. The right gate driving circuit is disposed on the right side of the active area, and is connected with a plurality of right gate lines to provide gate driving voltages for performing driving in a scanning direction. The scanning direction in which the left gate driving circuit performs driving is opposite to that in which the right gate driving circuit performs driving.

15 Claims, 6 Drawing Sheets

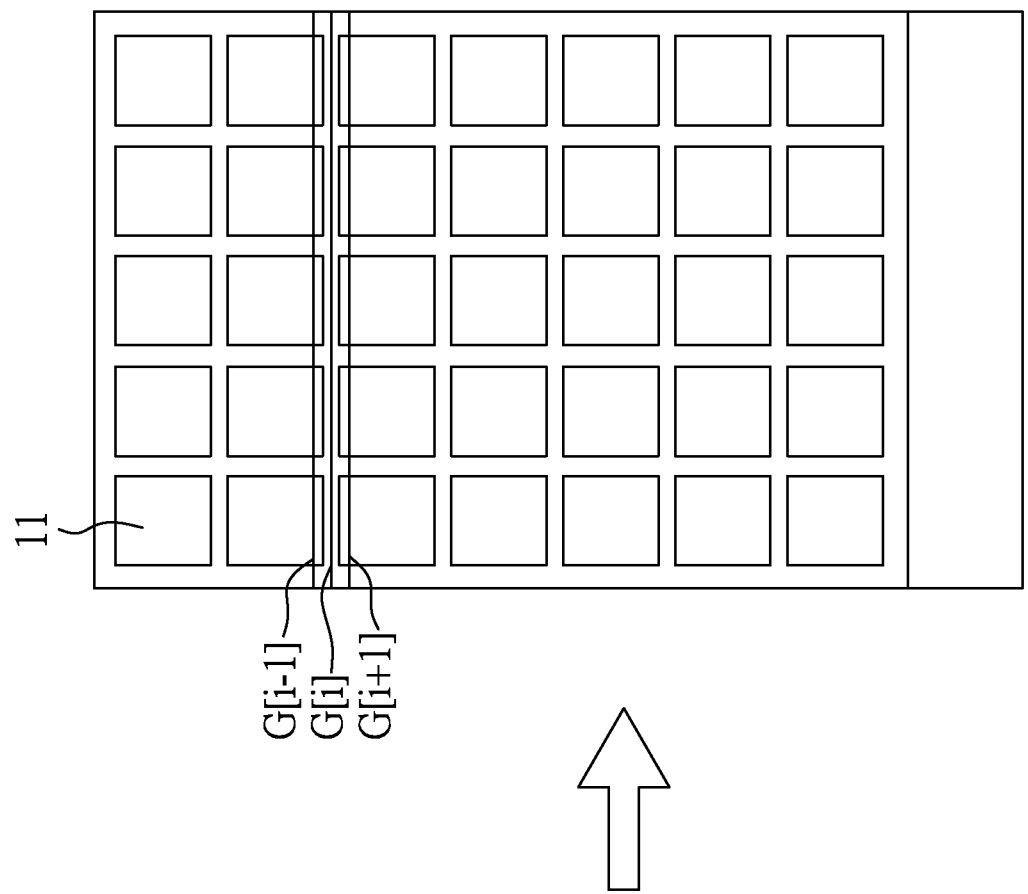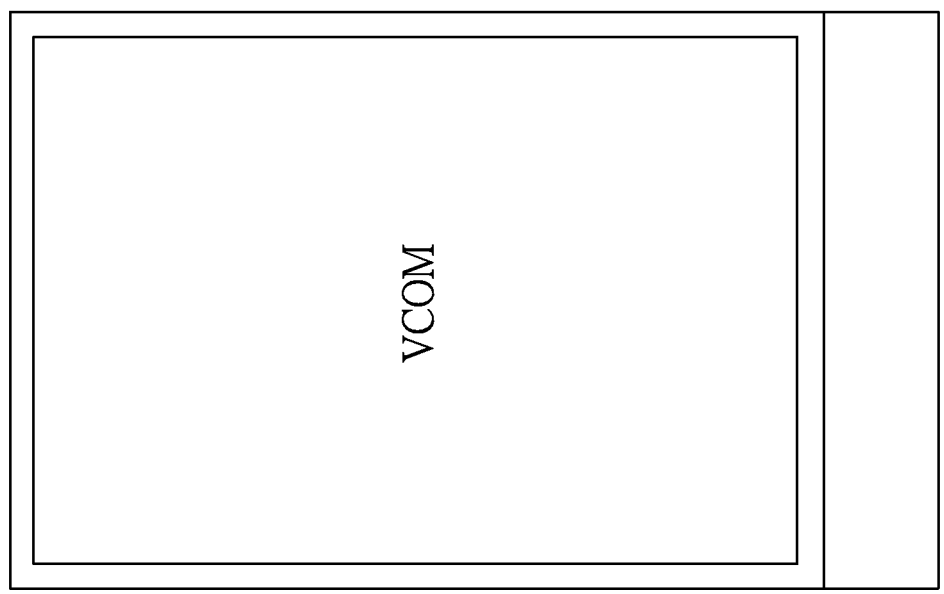
FIG. 1 (PRIOR ART)

DRIVING SYSTEM AND METHOD OF TOUCH DISPLAY PANEL

CROSS REFERENCE TO RELATED APPLICATION

This application claims the benefits of the Taiwan Patent Application Serial Number 109122758, filed on Jul. 6, 2020, the subject matter of which is incorporated herein by reference.

BACKGROUND

1. Field of the Disclosure

The present disclosure relates to a driving system and method of touch display panel and, more particular, to a driving system and method of touch display panel that is capable of avoiding mura caused by the gaps in the layout of touch electrodes.

2. Description of Related Art

The structure of the existing in-cell touch display panel is constituted by cutting the common electrode layer (VCOM), which is intact over the entire layer originally, into a plurality of touch electrodes. As shown in FIG. 1, because of the common electrode layer being cut into a plurality of touch electrodes 11, there exists an area not being covered by the common electrode layer. This area will cause the pixels of the touch display panel to have different loadings. When driving the gate lines, those gate lines that are not covered by the common electrode layer (such as G[i]) and those gate lines that are still covered by the common electrode layer (such as G[i−1], G[i+1], etc.) may generate different amount of coupling that causes a difference in the amount of coupling between the cut common electrode layers, resulting in a mura phenomenon. Especially for GOA (Gate driver On Array) touch display panels, due to the longer output width of the gate driving voltage of the gate line, the amount of coupling caused by the adjacent gate lines to the common electrode layer of the panel is relatively large. Therefore, for the area that is not covered by the common electrode layer, it is more likely to cause a difference in display compared with other areas that are covered by the common electrode layer.

Therefore, it is desirable to provide an improved driving system and method for touch display panel to mitigate and/or obviate the aforementioned mura problem caused by cutting the common electrode layer into a plurality of touch electrodes.

SUMMARY

The object of the present invention is to provide a driving system and method of touch display panel, in which the gate driving circuit performs driving in different scanning directions so as to avoid mura caused by the gaps between touch electrodes.

In one aspect, there is provided a driving system of touch display panel, which includes: a panel having an active area; a left gate driving circuit disposed on a left side of the active area and connected to a plurality of left gate lines for providing gate driving voltages to perform driving in a scanning direction; and a right gate driving circuit disposed on a right side of the active area and connected to a plurality of right gate lines for providing gate driving voltage to perform driving in a scanning direction, wherein the scanning direction in which the left gate driving circuit performs driving is opposite to the scanning direction in which the right gate driving circuit performs driving.

In another aspect, there is provided a method for driving a touch display panel, which includes: a panel having an active area, a left gate driving circuit disposed on a left side of the active area and connected to a plurality of left gate lines, and a right gate driving circuit disposed on a right side of the active area and connected to a plurality of right gate lines, wherein the plurality of left gate lines and the plurality of right gate lines are alternately arranged on the active area in sequence. The method includes: providing gate driving voltages in a scanning direction for performing driving by the left gate driving circuit; and providing gate driving voltages in a scanning direction for performing driving by the right gate driving circuit, wherein the scanning direction in which the left gate driving circuit performs driving is opposite to the scanning direction in which the right gate driving circuit performs driving.

Other objects, advantages, and novel features of the disclosure will become more apparent from the following detailed description when taken in conjunction with the accompanying drawings.

BRIEF DESCRIPTION OF THE DRAWINGS

FIG. 1 schematically illustrates the structure of a touch display panel in which a common electrode layer, which is originally intact over the entire layer, is cut into a plurality of touch electrodes.

DETAILED DESCRIPTION

The following embodiments describe the implementation and operation principles of the present disclosure. Those skilled in the art to which the present disclosure pertains may understand the features and effects of this disclosure through the aforementioned embodiments, and may perform combination, modification, replacement or adaption based on the spirit of the present disclosure.

Figure 2:
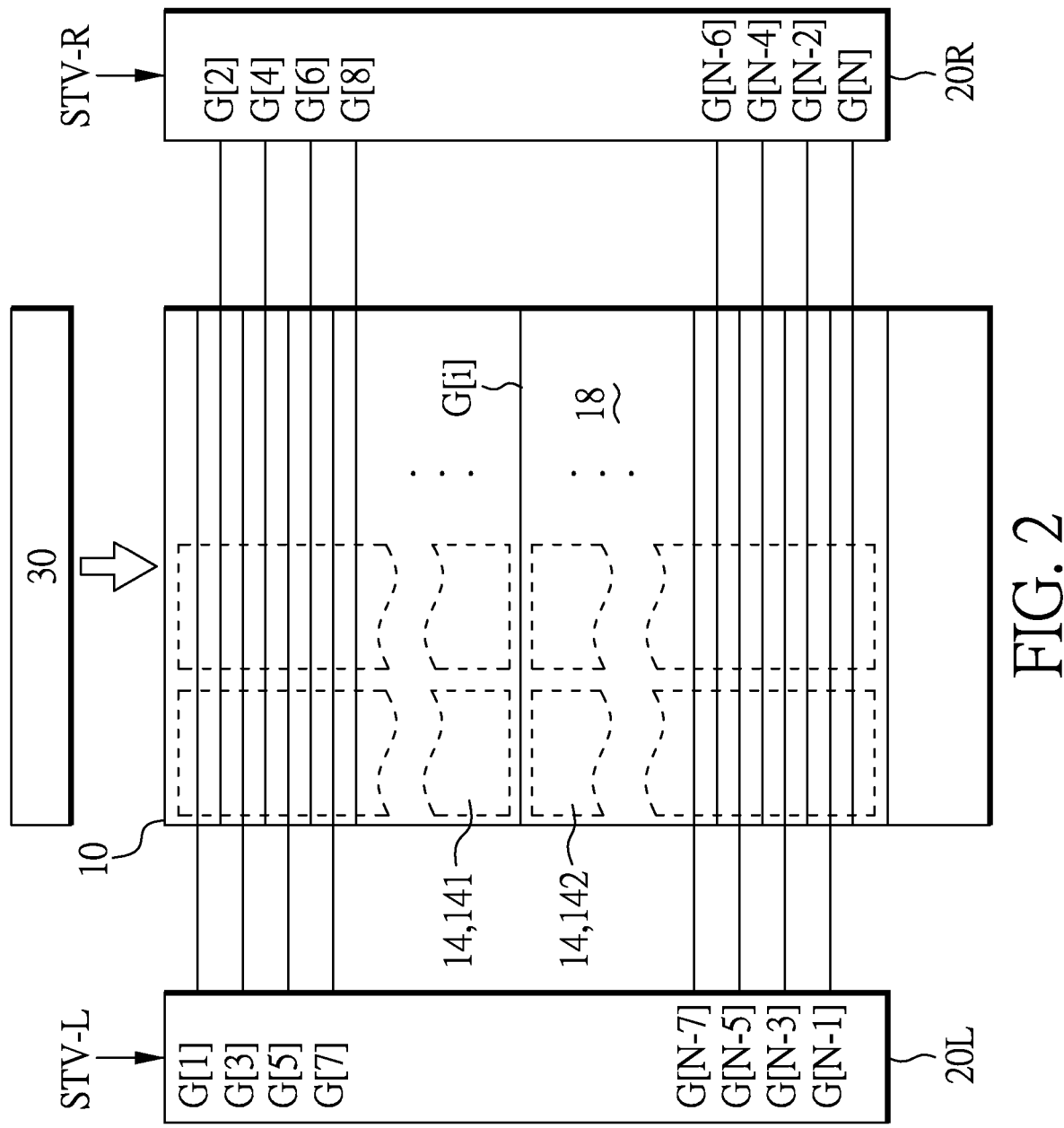
FIG. 2 schematically illustrates the driving system of touch display panel of the present disclosure.

FIG. 2 schematically illustrates the driving system of touch display panel of the present disclosure, which includes a panel 10, a left gate driving circuit 20L, a right gate driving circuit 20R, and a source driving circuit 30. The panel 10 is, for example, a touch display panel, and the panel 10 has an active area 18 for display or touch control. The left gate driving circuit 20L is arranged on the left side of the active area 18 of the panel 10, and the right gate driving circuit 20R is arranged on the right side of the active area 18 of the panel 10. The left gate driving circuit 20L and the right gate driving circuit 20R may be integrated circuit chips connected to the panel 10 or may be circuits directly fabricated on the panel 10. The left gate driving circuit 20L is connected with a plurality of left gate lines G[1], G[3], G[5] . . . G[N−5], G[N−3], G[N−1] in order to provide gate driving voltages for performing driving in a scanning direction, and the right gate driving circuit 20R is connected with a plurality of right gate lines G[2], G[4], G[6] . . . G[N−4], G[N−2], G[N] in order to provide gate driving voltages for performing driving in a scanning direction. The plurality of left gate lines and the plurality of right gate lines are alternately arranged on the active area 18 of the panel 10 in sequence. That is, the gate lines G[I], where I is an index number of the gate line and I=1~N, are sequentially arranged on the active area 18 of the panel 10 from top to bottom. In this embodiment, the left gate lines are odd-numbered gate lines G[1], G[3], G[5] . . . G[N−5], G[N−3], G[N−1], and the right gate lines are even-numbered gate lines G[2], G[4], G[6] . . . G[N−4], G[N−2], G[N]. However, the present disclosure is not limited to this embodiment, and it is conceivable that the left gate lines can be even-numbered gate lines G[2], G[4], G[6] . . . G[N−4], G[N−2], G[N], and the right gate lines can be odd-numbered gate lines G[1], G[3], G[5] . . . G[N−5], G[N−3], G[N−1].

The aforementioned source driving circuit 30 provides data voltages for the panel 10 to display data on the active area 18. The common electrode layer of the panel 10 is cut into a plurality of touch electrodes 14. The plurality of touch electrodes 14 are arranged in a matrix form on the active area 18 of the panel 10, and each touch electrode 14 has, for example, a rectangular shape. Since the common electrode layer of the panel 10 is cut into a plurality of touch electrodes 14, it results in areas not covered by the common electrode layer, and part of the gate lines G[1]~G[N] of the left gate driving circuit 20L and the right gate driving circuit 20R is located at the uncovered areas, and thus is not covered by the common electrode layer 12. That is, part of the gate lines on the active area 18 of the panel 10 is covered by the touch electrodes 14, and part of the gate lines is not covered by the touch electrodes 14. For those areas not covered by the common electrode layer, there are gaps formed between the touch electrodes. According to the display resolution and touch resolution of the panel 10, among the gate lines disposed to extend over vertically adjacent touch electrodes 141, 142, there will be at least one gate line G[i] that is not covered by the common electrode layer.

The aforementioned left gate driving circuit 20L is provided with a left start signal STV-L, and the left start signal STV-L can be connected to the first gate line G[1] of the left gate driving circuit 20L or the last gate line G[N−1] of the left gate driving circuit 20L. When the left start signal STV-L is connected to the first gate line G[1] of the left gate driving circuit 20L, it indicates that the left gate driving circuit 20L performs driving in a scanning direction starting from the first gate line G[1], so as to sequentially drive the gate lines G[1], G[3], G[5] . . . G[N−5], G[N−3], G[N−1] of the left gate driving circuit 20L in an index number ascending order. When the left start signal STV-L is connected to the last gate line G[N−1] of the left gate driving circuit 20L, it indicates that the left gate driving circuit 20L performs driving in a scanning direction starting from the last gate line G[N−1], so as to sequentially drive the gate lines G[N−1], G[N−3], G[N−5] . . . G[5], G[3], G[1] of the left gate driving circuit 20L in an index number descending order.

The aforementioned right gate driving circuit 20R is provided with a right start signal STV-R, and the right start signal STV-R can be connected to the first gate line G[2] of the left gate driving circuit 20R or the last gate line G[N] of the left gate driving circuit 20R. When the right start signal STV-R is connected to the first gate line G[2] of the right gate driving circuit 20R, it indicates that the right gate driving circuit 20R performs driving in a scanning direction starting from the first gate line G[2], so as to sequentially drive the gate lines G[2], G[4], G[6] . . . G[N−4], G[N−2], G[N] of the right gate driving circuit 20R in an index number ascending order. When the right start signal STV-R is connected to the last gate line G[N] of the right gate driving circuit 20R, it indicates that the right gate driving circuit 20R performs driving in a scanning direction starting from the last gate line G[N], so as to sequentially drive the gate lines G[N], G[N−2], G[N−4] . . . G[6], G[4], G[2] of the right gate driving circuit 20R in an index number descending order.

With the aforementioned driving system of touch display panel, in order to avoid or mitigate the occurrence of mura phenomenon, in the driving method of touch display panel of the present disclosure, the scanning direction in which the left gate driving circuit 20L performs driving is opposite to the scanning direction in which the right gate driving circuit 20R performs driving. That is, when the left gate driving circuit 20L drives the left gate lines G[1], G[3], G[5] . . . G[N−5], G[N−3], G[N−1] along the ascending direction of the left gate lines (that is, the direction from the first left gate line G[1] to the last left gate line G[N−1], or from top to bottom relative to the panel 10), the right gate driving circuit 20R drives the gate lines (G[N], G[N−2], G[N−4] . . . G[6], G[4], G[2]) along the descending direction of the right gate lines (that is, the direction from the last right gate line G[N] to the first right gate line G[2], or from bottom to top relative to the panel 10). On the contrary, when the right gate driving circuit 20R drives the gate lines G[2], G[4], G[6] . . . G[N−4], G[N−2], G[N] along the ascending direction of the right gate lines (that is, the direction from the first right gate line G[2] to the last right gate line G[N], or from top to bottom relative to the panel 10), the left gate driving circuit 20L drives the gate lines G[N−1], G[N−3], G[N−5] . . . G[5], G[3], G[1] along the descending direction of the left gate line (that is, the direction from the last left gate line G[N−1] to the first left gate line G[1], or from bottom to top relative to the panel 10). The following embodiments illustrate the driving method for touch display panel of the present disclosure.

Figure 3:
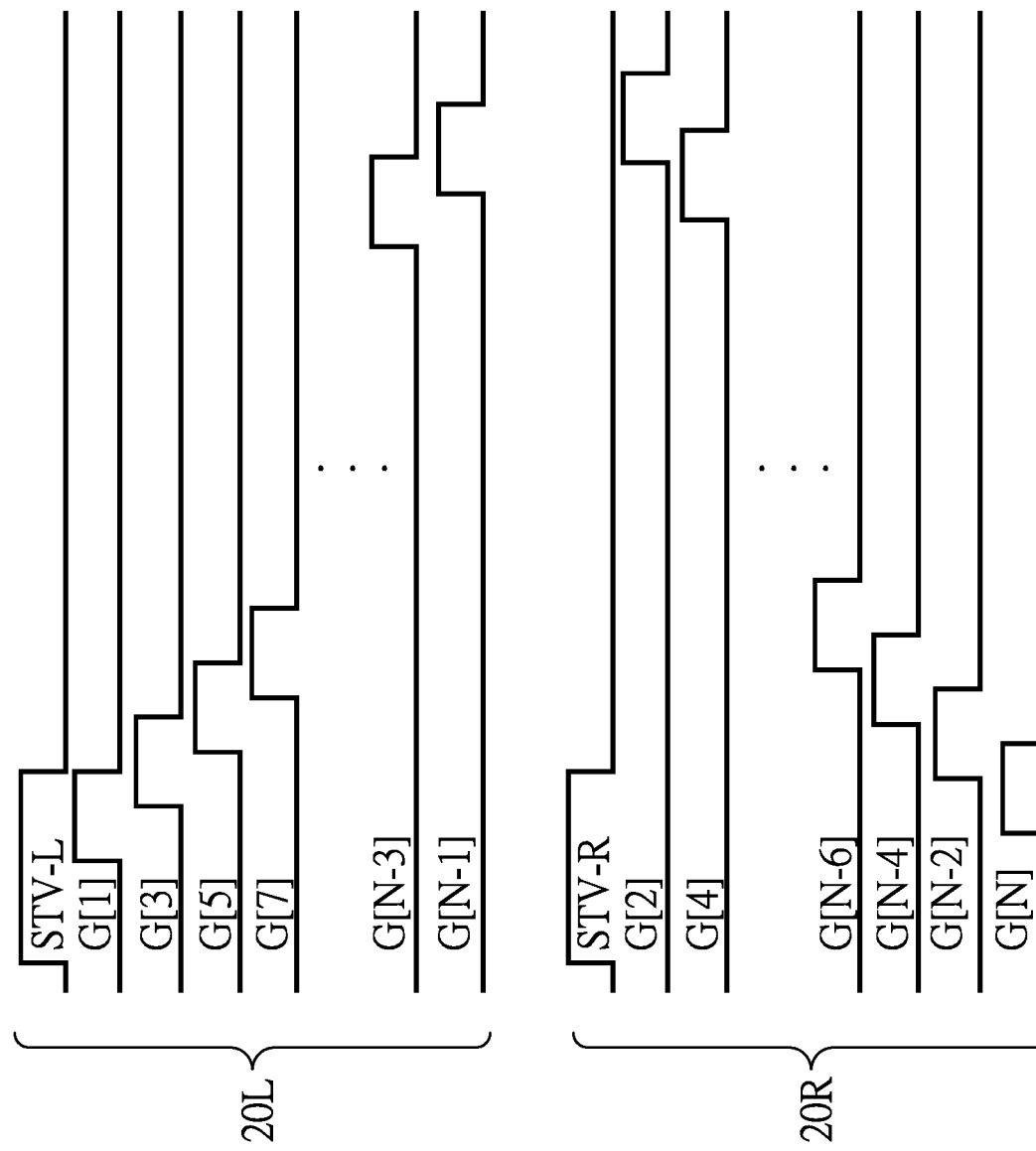
FIG. 3 is a driving timing diagram of the driving method of touch display panel according to one embodiment of the present disclosure.

FIG. 3 is a driving timing diagram of the driving method of touch display panel according to one embodiment of the present disclosure. In the driving method of this embodiment, the left start signal STV-L is connected to the first gate line G[1] of the left gate driving circuit 20L, and the right start signal STV-R is connected to the last gate line G[N] of the right gate driving circuit 20R, so that the left gate driving circuit 20L performs driving, starting from the gate line G[1], along the ascending direction of the left gate lines (i.e. the index number of left gate lines is increasing such as G[1], G[3], G[5] . . . G[N−5], G[N−3], G[N−1]), and the right gate driving circuit 20R performs driving, starting from the gate line G[N], along the descending direction of the right gate lines (i.e. the index number of right gate lines is decreasing such as G[N], G[N−2], G[N−4] . . . G[6], G[4], G[2]). In this embodiment, the left start signal STV-L starting the gate line G[1] is ahead of the right start signal STV-R starting the gate line G[N]. Therefore, in overall, the left gate driving circuit 20L and the right gate driving circuit 20R perform driving in the sequence of G[1], G[N], G[3], G[N−2], G[5], G[N−4] . . . G[N−5], G[6], G[N−3], G[4], G[N−1], G[2].

Figure 4:
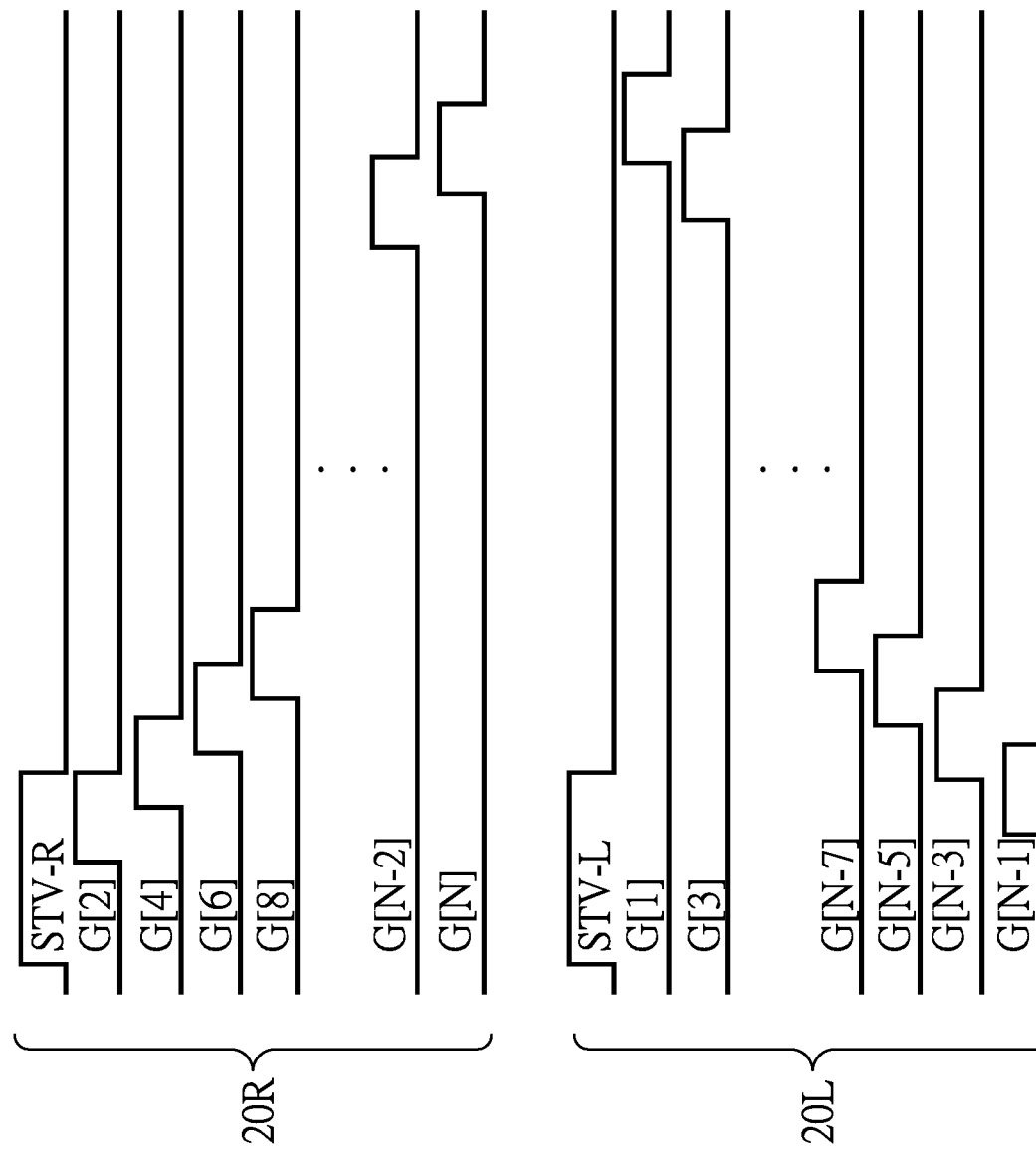
FIG. 4 is a driving timing diagram of the driving method of touch display panel according to another embodiment of the present disclosure.

FIG. 4 is a driving timing diagram of the driving method of touch display panel according to another embodiment of the present disclosure. In the driving method of this embodiment, the right start signal STV-R is connected to the first gate line G[2] of the right gate driving circuit 20R, and the left start signal STV-L is connected to the last gate line G[N−1] of the left gate driving circuit 20L, so that the right gate driving circuit 20R performs driving, starting from the gate line G[2], along the ascending direction of the right gate lines (i.e. the index number of right gate lines is increasing such as G[2], G[4], G[6] . . . G[N−4], G[N−2], G[N]), and the left gate driving circuit 20L performs driving, starting from the gate line G[N−1], along the descending direction of the left gate lines (i.e. the index number of left gate lines is decreasing such as G[N−1], G[N−3], G[N−5] . . . G[5], G[3], G[1]). In this embodiment, the right start signal STV-R starting the gate line G[2] is ahead of the left start signal STV-L starting the gate line G[N−1]. Therefore, in overall, the right gate drive circuit 20R and the left gate drive circuit 20L perform driving in the sequence of G[2], G[N−1], G[4], G[N−3], G[6], G[N−5] . . . G[N−4], G[5], G[N−2], G[3], G[N], G[1].

Figure 5:
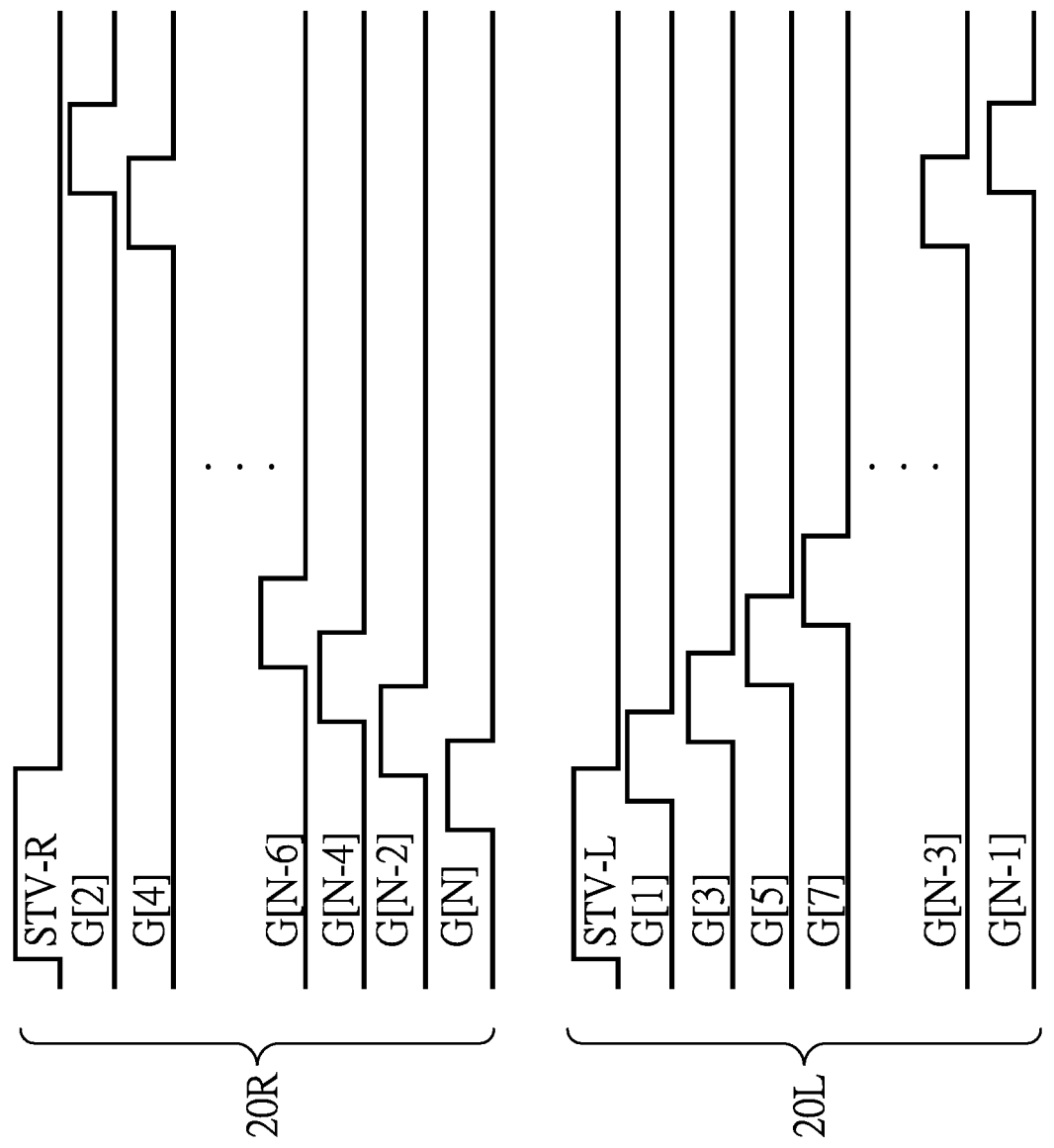
FIG. 5 is a driving timing diagram of the driving method of touch display panel according to still another embodiment of the present disclosure.

FIG. 5 is a driving timing diagram of the driving method of touch display panel according to still another embodiment of the present disclosure. In the driving method of this embodiment, the right start signal STV-R is connected to the last gate line G[N] of the right gate driving circuit 20R, and the left start signal STV-L is connected to the first gate line G[1] of the left gate driving circuit 20L, so that the right gate driving circuit 20R performs driving, starting from the gate line G[N], along the descending direction of the right gate lines (i.e. the index number of right gate lines is decreasing such as G[N], G[N−2], G[N−4] . . . G[6], G[4], G[2]), and the left gate driving circuit 20L performs driving, starting from the gate line G[1], along the ascending direction of the left gate lines (i.e. the index number of left gate lines is increasing such as G[1], G[3], G[5] . . . G[N−5], G[N−3], G[N−1]). In this embodiment, the right start signal STV-R starting the start gate line G[N] is ahead of the left start signal STV-L starting the gate line G[1]. Therefore, in overall, the right gate driving circuit 20R and the left gate driving circuit 20L perform driving in the sequence of G[N], G[1], G[N−2], G[3], G[N−4], G[5] . . . G[6], G[N−5], G[4], G[N−3], G[2] G[N−1].

Figure 6:
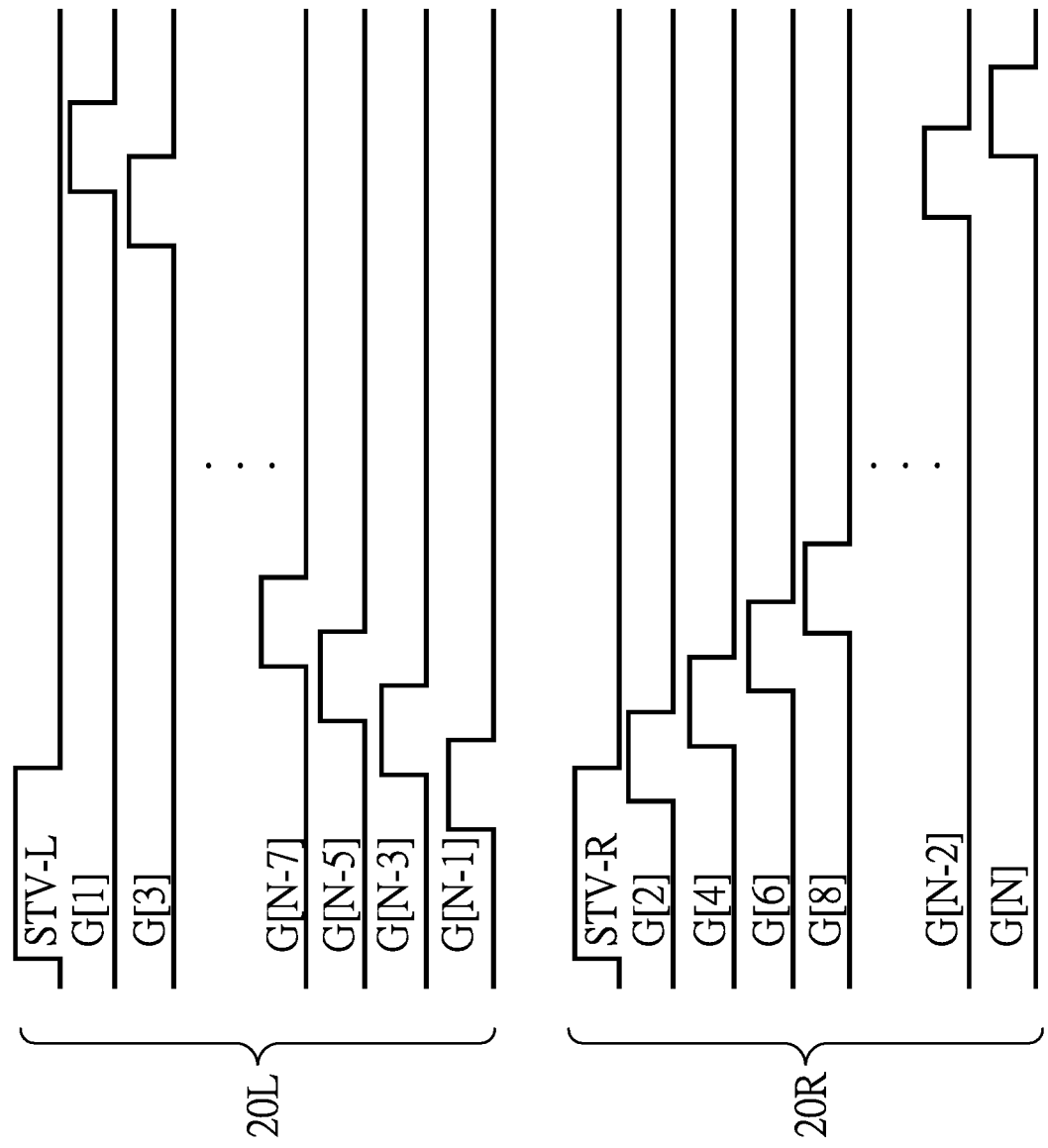
FIG. 6 is a driving timing diagram of the driving method of touch display panel according to yet another embodiment of the present disclosure.

FIG. 6 is a driving timing diagram of the driving method of touch display panel according to yet another embodiment of the present disclosure. In the driving method of this embodiment, the left start signal STV-L is connected to the last gate line G[N−1] of the left gate driving circuit 20L, and the right start signal STV-R is connected to the first gate line G[2] of the right gate driving circuit 20R, so that the left gate driving circuit 20L performs driving, starting from the gate line G[N−1], along the descending direction of the left gate lines (i.e. the index number of left gate lines is decreasing such as G[N−1], G[N−3], G[N−5] . . . G[5], G[3], G[1]), and the right gate driving circuit 20R performs driving, starting from the gate line G[2], along the ascending direction of the right gate lines (i.e. the index number of right gate lines is increasing such as G[2], G[4], G[6] . . . G[N−4], G[N−2], G[N]. In this embodiment, the left start signal STV-L starting the gate line G[N−1] is ahead of the right start signal STV-R starting the gate line G[2]. Therefore, in overall, the left gate driving circuit 20L and the right gate driving circuit 20R perform driving in the sequence of G[N−1], G[2], G[N−3], G[4], G[N−5], G[6] . . . G[5], G[N−4], G[3], G[N−2], G[1], G[N].

In addition, in the aforementioned embodiments, since the left gate driving circuit 20L and the right gate driving circuit 20R perform driving in different scanning directions, respectively, the timing of the source driving circuit 30 for pro- viding the data voltages is modified accordingly so as to correctly display data on the active area 18 of the panel 10. Those techniques can be understood by those skilled in the art based on the disclosure of the present invention, and thus a detailed description therefor is deemed unnecessary.

In summary, since the left gate driving circuit 20L and the right gate driving circuit 20R perform driving in different scanning directions, respectively, the adjacent gate lines will not be turned on and scanned continuously, and thus it is able to avoid the problem that the adjacent gate lines may cause a large amount of coupling to the common electrode layer of the panel, so as to effectively reduce the amount of coupling of the gate lines to the common electrode layer, thereby enabling the common electrode layer to have better stability and alleviating the mura phenomenon caused by uneven loading on the common electrode layer.

The aforementioned embodiments are examples only for convenience of description. The scope of the present disclosure is claimed hereinafter in the claims and is not limited to the embodiments.

What is claimed is:

1. A driving system of touch display panel, comprising:
   a panel having an active area;
   a left gate driving circuit disposed on a left side of the active area and connected to a plurality of left gate lines for providing gate driving voltages to perform driving in a scanning direction; and
   a right gate driving circuit disposed on a right side of the active area and connected to a plurality of right gate lines for providing gate driving voltage to perform driving in a scanning direction, wherein the left gate lines and the right gate lines are odd-numbered gate lines and even-numbered gate lines, respectively, or are even-numbered gate lines and odd-numbered gate lines, respectively,
   wherein the scanning direction in which the left gate driving circuit performs driving is opposite to the scanning direction in which the right gate driving circuit performs driving, and the left gate driving circuit and the right gate driving circuit perform driving in an alternating sequence of one odd-numbered gate line and one even-numbered gate line.

2. The driving system of touch display panel as claimed in claim 1, wherein the left gate driving circuit performs driving along an ascending direction of the plurality of left gate lines, and the right gate driving circuit performs driving along a descending direction of the plurality of right gate lines.

3. The driving system of touch display panel as claimed in claim 2, wherein the left gate driving circuit performs driving, starting from a first left gate line, along the ascending direction of the plurality of left gate lines, and the right gate driving circuit performs driving, starting from a last right gate line, along the descending direction of the plurality of right gate lines, while starting the first left gate line is ahead of starting the last right gate line, and wherein the plurality of left gate lines are odd-numbered gate lines and the plurality of right gate lines are even-numbered gate lines, such that the left gate driving circuit and the right gate driving circuit perform driving in a sequence of G[1], G[N], G[3], G[N−2], G[5], G[N−4], . . . G[N−5], G[6], G[N−3], G[4], G[N−1], G[2], where G[1], G[3], G[5], . . . G[N−5], G[N−3], G[N−1] represent the odd-numbered gate lines, and G[2], G[4], G[6], . . . G[N−4], G[N−2], G[N] represent the even-numbered gate lines.

4. The driving system of touch display panel as claimed in claim 2, wherein the right gate driving circuit performs driving, starting from a last right gate line, along the descending direction of the plurality of right gate lines, and the left gate driving circuit performs driving, starting from a first left gate line, along the ascending direction of the plurality of left gate lines, while starting the last right gate line is ahead of starting the first left gate line, and wherein the plurality of left gate lines are odd-numbered gate lines and the plurality of right gate lines are even-numbered gate lines, such that the right gate driving circuit and the left gate driving circuit perform driving in a sequence of G[N], G[1], G[N−2], G[3], G[N−4], G[5], . . . G[6], G [N−5], G[4], G[N−3], G[2] G[N−1], where G[1], G[3], G[5], . . . G[N−5], G[N−3], G[N−1] represent the odd-numbered gate lines, and G[2], G[4], G[6], . . . G[N−4], G[N−2], G[N] represent the even-numbered gate lines.

5. The driving system of touch display panel as claimed in claim 1, wherein the right gate driving circuit performs driving along an ascending direction of the plurality of right gate lines, and the left gate driving circuit performs driving along a descending direction of the plurality of left gate lines.

6. The driving system of touch display panel as claimed in claim 5, wherein the right gate driving circuit performs driving, starting from a first right gate line, along the ascending direction of the plurality of right gate lines, and the left gate driving circuit performs driving, starting from a last left gate line, along the descending direction of the plurality of left gate lines, while starting the first right gate line is ahead of starting the last left gate line, and wherein the plurality of left gate lines are odd-numbered gate lines and the plurality of right gate lines are even-numbered gate lines, such that the right gate drive circuit and the left gate drive circuit perform driving in a sequence of G[2], G[N−1], G[4], G[N−3], G[6], G[N−5], . . . G[N−4], G[5], G[N−2], G[3], G[N], G[1], where G[1], G[3], G[5], . . . G[N−5], G[N−3], G[N−1] represent the odd-numbered gate lines, and G[2], G[4], G[6], . . . G[N−4], G[N−2], G[N] represent the even-numbered gate lines.

7. The driving system of touch display panel as claimed in claim 5, wherein the left gate driving circuit performs driving, starting from a last left gate line, along the descending direction of the plurality of left gate lines, and the right gate driving circuit performs driving, starting from a first right gate line, along the ascending direction of the plurality of right gate lines, while starting the last left gate line is ahead of starting the first right gate line, and wherein the plurality of left gate lines are odd-numbered gate lines and the plurality of right gate lines are even-numbered gate lines, such that the left gate driving circuit and the right gate driving circuit perform driving in a sequence of G[N−1], G[2], G[N−3], G[4], G[N−5], G[6], . . . G[5], G[N−4], G[3], G[N−2], G[1], G[N], where G[1], G[3], G[5], . . . G[N−5], G[N−3], G[N−1] represent the odd-numbered gate lines, and G[2], G[4], G[6], . . . G[N−4], G[N−2], G[N] represent the even-numbered gate lines.

8. The driving system of touch display panel as claimed in claim 1, wherein the plurality of left gate lines and the plurality of right gate lines are alternately arranged on the active area of the panel in sequence.

9. A method for driving a touch display panel including a panel having an active area, a left gate driving circuit disposed on a left side of the active area and connected to a plurality of left gate lines, and a right gate driving circuit disposed on a right side of the active area and connected to a plurality of right gate lines, wherein the plurality of left gate lines and the plurality of right gate lines are alternately arranged on the active area in sequence, and the left gate lines and the right gate lines are odd-numbered gate lines and even-numbered gate lines, respectively, or are even-numbered gate lines and odd-numbered gate lines, respectively, the method comprising:
providing gate driving voltages in a scanning direction for performing driving by the left gate driving circuit; and
providing gate driving voltages in a scanning direction for performing driving by the right gate driving circuit,
wherein the scanning direction in which the left gate driving circuit performs driving is opposite to the scanning direction in which the right gate driving circuit performs driving, and the left gate driving circuit and the right gate driving circuit perform driving in an alternating sequence of one odd-numbered gate line and one even-numbered gate line.

10. The method as claimed in claim 9, wherein the left gate driving circuit performs driving along an ascending direction of the plurality of left gate lines, and the right gate driving circuit performs driving along a descending direction of the plurality of right gate lines.

11. The method as claimed in claim 10, wherein the left gate driving circuit performs driving, starting from the first left gate line, along the ascending direction of the plurality of left gate lines, and the right gate driving circuit performs driving, starting from the last right gate line, along the descending direction of the plurality of right gate lines, while starting the first left gate line is ahead of starting the last right gate line, and wherein the plurality of left gate lines are odd-numbered gate lines and the plurality of right gate lines are even-numbered gate lines, such that the left gate driving circuit and the right gate driving circuit perform driving in a sequence of G[1], G[N], G[3], G[N−2], G[5], G[N−4], . . . G[N−5], G[6], G[N−3], G[4], G[N−1], G[2], where G[1], G[3], G[5], . . . G[N−5], G[N−3], G[N−1] represent the odd-numbered gate lines, and G[2], G[4], G[6], . . . G[N−4], G[N−2], G[N] represent the even-numbered gate lines.

12. The method as claimed in claim 10, wherein the right gate driving circuit performs driving, starting from a last right gate line, along the descending direction of the plurality of right gate lines, and the left gate driving circuit performs driving, starting from a first left gate line, along the ascending direction of the plurality of left gate lines, while starting the last right gate line is ahead of starting the first left gate line, and wherein the plurality of left gate lines are odd-numbered gate lines and the plurality of right gate lines are even-numbered gate lines, such that the right gate driving circuit and the left gate driving circuit perform driving in a sequence of G[N], G[1], G[N−2], G[3], G[N−4], G[5], . . . G[6], G [N−5], G[4], G[N−3], G[2] G[N−1], where G[1], G[3], G[5], . . . G[N−5], G[N−3], G[N−1] represent the odd-numbered gate lines, and G[2], G[4], G[6], . . . G[N−4], G[N−2], G[N] represent the even-numbered gate lines.

13. The method as claimed in claim 9, wherein the right gate driving circuit performs driving along an ascending direction of the plurality of right gate lines, and the left gate driving circuit performs driving along a descending direction of the plurality of left gate lines.

14. The method as claimed in claim 13, wherein the right gate driving circuit performs driving, starting from a first right gate line, along the ascending direction of the plurality of right gate lines, and the left gate driving circuit performs driving, starting from a last left gate line, along the descending direction of the plurality of left gate lines, while starting the first right gate line is ahead of starting the last left gate line, and wherein the plurality of left gate lines are odd-numbered gate lines and the plurality of right gate lines are even-numbered gate lines, such that the right gate drive circuit and the left gate drive circuit perform driving in a sequence of G[2], G[N−1], G[4], G[N−3], G[6], G[N−5], . . . G[N−4], G[5], G[N−2], G[3], G[N], G[1], where G[1], G[3], G[5], . . . G[N−5], G[N−3], G[N−1] represent the odd-numbered gate lines, and G[2], G[4], G[6], . . . G[N−4], G[N−2], G[N] represent the even-numbered gate lines.

15. The method as claimed in claim 13, wherein the left gate driving circuit performs driving, starting from a last left gate line, along the descending direction of the plurality of left gate lines, and the right gate driving circuit performs driving, starting from a first right gate line, along the ascending direction of the plurality of right gate lines, while starting the last left gate line is ahead of starting the first right gate line, and wherein the plurality of left gate lines are odd-numbered gate lines and the plurality of right gate lines are even-numbered gate lines, such that the left gate driving circuit and the right gate driving circuit perform driving in a sequence of G[N−1], G[2], G[N−3], G[4], G[N−5], G[6], . . . G[5], G[N−4], G[3], G[N−2], G[1], G[N], where G[1], G[3], G[5], . . . G[N−5], G[N−3], G[N−1] represent the odd-numbered gate lines, and G[2], G[4], G[6], . . . G[N−4], G[N−2], G[N] represent the even-numbered gate lines.

* * * * *